United States Patent
Naedele et al.

(10) Patent No.: US 10,482,270 B2
(45) Date of Patent: Nov. 19, 2019

(54) METHOD FOR PROCESSING DATA STREAMS WITH MULTIPLE TENANTS

(71) Applicant: ABB Technology AG, Zürich (CH)

(72) Inventors: Martin Naedele, Zürich (CH); Thomas Locher, Zürich (CH)

(73) Assignee: ABS Schweiz AG, Baden (CH)

( * ) Notice: Subject to any disclaimer, the term of this patent is extended or adjusted under 35 U.S.C. 154(b) by 662 days.

(21) Appl. No.: 14/602,796

(22) Filed: Jan. 22, 2015

(65) Prior Publication Data

US 2015/0205967 A1    Jul. 23, 2015

(30) Foreign Application Priority Data

Jan. 23, 2014   (EP) .................................... 14152300

(51) Int. Cl.
| | |
|---|---|
| *G06F 21/60* | (2013.01) |
| *H04L 29/06* | (2006.01) |
| *H04L 12/725* | (2013.01) |

(52) U.S. Cl.
CPC .......... *G06F 21/606* (2013.01); *G06F 21/602* (2013.01); *H04L 45/308* (2013.01); *H04L 63/0428* (2013.01); *H04L 65/60* (2013.01)

(58) Field of Classification Search
CPC . G06F 21/606; G06F 21/602; H04L 12/5689; H04L 63/0428; H04L 65/60
See application file for complete search history.

(56) References Cited

U.S. PATENT DOCUMENTS

| | | | | |
|---|---|---|---|---|
| 6,144,402 | A  * | 11/2000 | Norsworthy | ....... H04N 7/17309 |
| | | | | 348/552 |
| 7,895,617 | B2 * | 2/2011 | Pedlow, Jr. | .......... G11B 27/034 |
| | | | | 386/278 |
| 9,065,884 | B2 * | 6/2015 | Gardner | .................... H04N 7/52 |
| 9,264,774 | B2 * | 2/2016 | Oliver | ................ H04N 21/4627 |
| 9,420,026 | B2 * | 8/2016 | Baldwin | ............... H04L 65/602 |
| 2007/0263860 | A1* | 11/2007 | Buchen | .................. H04N 7/162 |
| | | | | 380/42 |
| 2010/0091835 | A1 | 4/2010 | Morris | |
| 2013/0212228 | A1 | 8/2013 | Butler et al. | |
| 2014/0168354 | A1* | 6/2014 | Clavel | .................... H04N 7/152 |
| | | | | 348/14.09 |

OTHER PUBLICATIONS

Extended European Search Report dated Jun. 6, 2014, by the European Patent Office in corresponding European Patent Application No. 14152300.0-1853. (6 pages).

* cited by examiner

*Primary Examiner* — Azizul Choudhury
(74) *Attorney, Agent, or Firm* — Taft Stettinius & Hollister LLP; J. Bruce Schelkopf

(57) ABSTRACT

The present disclosure relates to the field of processing data in the stream processing network, such as processing data having data streams associated with multiple owners or entities. A method is disclosed of secure processing of input data by a stream processing network having first and second processing units, wherein the method can include: a) receiving input data from a communication channel, wherein the input data includes a first data stream associated with a first owner and a second data stream associated with a second owner; b) distinguishing data packets of the first data stream from that of the second data stream; and c) processing the first data stream with the first processing unit.

18 Claims, 1 Drawing Sheet

METHOD FOR PROCESSING DATA STREAMS WITH MULTIPLE TENANTS

FIELD OF THE INVENTION

The invention relates to the field of processing data in stream processing network, in particular, to a method of secure processing the data streams associated with multiple owners.

BACKGROUND OF THE INVENTION

Stream processing is a computer programming paradigm concerned with the processing of data, i.e. input data, that enters the processing system in the form of data streams being potentially unbounded in length. A stream processing system enables a user to perform computations on data that is arriving steadily and to output results continuously. In order to ensure a certain level of fault-tolerance and scalability, stream processing systems are typically distributed systems, where the individual processing elements are scattered over multiple interconnected computers.

While such systems achieve the desired fault-tolerance and scalability, there is no secure support for multiple concurrent users. That is, current stream processing frameworks, such as Storm or S4, do not contain special mechanisms to keep the messages associated with different owners separate and confidential. As a result, if multiple data owners used the same processing infrastructure, then information could leak between streams, which could lead to a breach of confidentiality. Currently, this problem is resolved by limiting the application to a single data stream owning entity.

DESCRIPTION OF THE INVENTION

It is an objective of the invention to provide a method for secure transmission of multi-owner data streams within stream processing units distributed in the streaming processing network.

This objective is achieved by a method and a device according to the independent claims. Preferred embodiments are evident from the dependent patent claims.

The present invention provides a method of secure processing input data by a stream processing network comprising a first and a second processing unit, wherein the method comprises the steps of: a) receiving the input data from a communication channel, wherein the input data comprises a first data stream associated with a first owner and a second data stream associated with a second owner; b) distinguishing data packets of the first data stream from that of the second data stream; and c) processing the first data stream with the first processing unit. The communication channel is typically a packet-switched data network path. Thought this common path the multiple data streams comprised in the input data are transmitted towards the stream processing network.

The multiple data streams are transmitted over the same communication channel, i.e. the data packets of the multiple data streams are mixed together. In step b) the data packets of the multiple data streams will be separated, i.e. isolated from each other. This enables that a particular data stream can be securely processed in a processing unit, i.e. the content of this data stream is not revealed by the other processing unit, although the multiple data streams share the same communication channel when transmitting towards the multiple processing units. In step c) the data packets belonging to the particular data streams are accumulated in order to form each individual data stream.

The owner IDs are unique and relate to the respective owner. The owners may be also called entities or tenants identifying to whom a data stream belongs to. The processing unit may be also called processing element or machine that may be a separate component or an integrated part of the node that is supposed to receive the data stream.

According to another aspect, the present invention provides a system for secure processing input data comprising a first data stream associated with a first owner and a second data stream associated with a second owner. The system comprises a first and a second processing unit distributed in a stream processing network. The system is adapted to distinguish data packets of the first data stream from the second data stream, and to process the first data stream with the first processing unit.

In an first exemplary embodiment, prior to the step a) or at least step b) the method further comprises a step of: labelling the first and the second data stream with a first and a second owner ID, respectively. The step of labelling the data packets may be adding or appending the unique owner ID as meta tags into the headers of the data packets. Based on the label of the data packets, the data streams can be separated from each other. In other words, in the step b), the data packets of the first data stream may be distinguished from that of the second data stream, using the labels of the data packets.

Preferably, the method further comprises the step of: processing the second data stream with the second processing unit.

In an second exemplary embodiment, the first data stream may comprise a confidential part. In this case, the data packets of the first data stream are encrypted prior to transmission towards the stream processing network, in addition to the step of labelling. The first processing unit then decrypts the first data stream using a first decryption key corresponding to a first encryption key used for encrypting the first data stream, where the first encryption is may be indicated in the headers of the data packets, e.g. in form of meta tags. For further transportation and processing of the data streams, the data packets may be re-encrypted.

In case the second data stream also comprises a confidential part, at least the confidential part of the second data stream can be encrypted prior to transmission towards the processing network. The second processing unit then decrypts the first data stream using a first decryption key corresponding to a first encryption key used for encrypting the first data stream.

The steps of encrypting and processing may be carried out by means of homomorphic encryption. The confidential part of the first or second data stream may be relevant or of interest for multiple owner IDs. In other words, each data stream in associated with one owner but some parts may be of interest to multiple owner. Homomorphic encryption allows them to perform some computations that is useful for them even if they cannot access the data itself due to the reason that the stream is associated with another owner.

Preferably, the homomorphic encryption is used to compute aggregate information on the encrypted data items directly using the first or second data stream. This guarantees that no confidential information is ever revealed. Alternatively, the homomorphic encryption may be used to provide computational functions across multiple entities.

As described above, in order to circumvent the problem mentioned in the background of the invention, the present application creates one application instance, i.e. a stream processing network, for each owner separately. This invention allows a stream processing system to perform stream processing for different entities/customers on the same application instance, providing confidentiality and integrity for each entity's data, and enabling the secure aggregation of the data of all entities.

As an example, this mechanism makes it possible to run SCADA applications for different customers on a single instance of a cloud-based SCADA infrastructure. There are no previous solutions to the problem of allowing multiple entities to use the same stream processing system in a secure manner.

The present invention requires less hardware due to the sharing of resources, which reduces cost, and it enables new applications through the controlled sharing of data between different entities, or aggregation of data over multiple entities, which are not possible when running fully separate instances.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

The aspect of the invention is to isolate streams associated with different entities by labeling data streams and intermediate processing results in algorithms with a unique tenant ID, and keeping differently labeled data in different processing elements, which may or may not reside on the same physical machines. Labelling a data stream means for instance adding some meta tags to the data packets of the data stream.

In addition to the labelling step, the messages can be encrypted, wherever a processing element is handling data of different entities. The used encryption key may be indicated in form of a meta tag in the data packets, so that the processing element receiving the data packets later on knows which encryption key has been used and can decrypt the data packets as long as it has the decryption key.

The step of labeling ensures that processing elements only see confidential data for a specific entity. The algorithms may be stateful algorithms, e.g. averages, sums, min/max or the similar. The different labeled data streams are processed in different processing elements in order to avoid any leakage from the process element that handles a data stream having a confidential part. Non-confidential data streams do not need a label. These data streams may be processed by any processing element.

The encryption approach has several benefits. As the data is encrypted, only dedicated processing elements with access to decryption keys can read the data, and the data is protected against eavesdropping. Moreover, any processing element may be allowed to read in the data stream. While a processing element without the decryption key may not be able to make sense of the data, it can still perform some operations, e.g., annotate it with a timestamp or route the stream etc. Hence, this approach requires a safe mechanism to install the required keys at the various processing elements in the system. Assuming that each processing element can be uniquely identified, a standard key-exchange mechanism can be used for this purpose.

In encryption process, a processing element may be allowed to receive data streams from different tenants if the data items are encrypted. The processing element can then simply route the data items, perform some analysis that does not require reading the data, e.g., counting, perform some aggregate analysis on the data without revealing individual data points, e.g., based on multi-party computation, and/or decrypt and process data items from streams for which it has the key and is therefore granted access.

In comparison with the encryption step, the mere labelling step has less computational overhead since no cryptographic operation for encryption is required.

Figure 1:
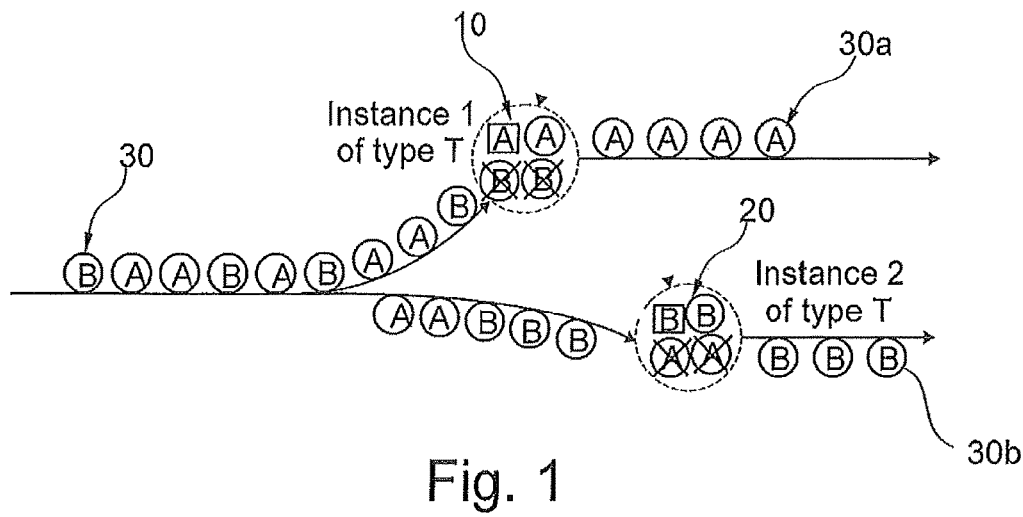
FIG. 1 schematically shows labelling of multi-tenant data stream for secure transmission in the stream processing network according to the present invention, where the processing units processes or rejects the messages according to the label.

FIG. 1 schematically shows a diagram for processing streams of input data 30 in a network of distributed processing elements 10 and 20 and channels between those processing elements. The data 30 is transmitted over a communication channel. The transmission may be in a manner of broadcast such that both processing units 10 and 20 receive the data 30. Alternatively, the data 30 may be also transmitted to the processing unit 10 while a copy of the data 30 is transmitted to the processing unit 20. The data 30 associated with different entities/tenants needs to be processed in a such way to prevent a potential breach of confidentiality. As shown, the data 30 comprises data packets A and B, that belong to different data streams 30a and 30b, respectively. The data packets A means data packets having a label "A", while the data packets B are data packets having a label "B". By means of labeling the data packets A and B, the data streams 30a and 30b can be isolated or separated from each other. For example, when the processing element 10 receives the data 30 comprising data streams 30a and 30b, it rejects or ignores the data packets of the data stream 30b according to the labelling, i.e. it only accepts the data packets labelled with "A" that belong to data stream 30a. Similarly, when the processing element 20 receives the data 30 comprising data streams 30a and 30b, it rejects or ignores the data packets of the data stream 30a according to the labelling, i.e. it only accepts the data packets labelled with "B" that belong to data stream 30b. Therefore, the process element 10 only handles data packets A that form the data stream 30a, while the process element 20 only handles data packets B that form the data stream 30b.

The step of labelling may be carried out for instance by adding or appending some meta tags indicative the owner ID, e.g. "A" or "B", into headers of a data packet.

The individual instances of channels and processing elements 10 and 20 exist per entity, and where data 30 that is labeled can be transported/processed only on channels and processing elements matching the label.

Figure 2:
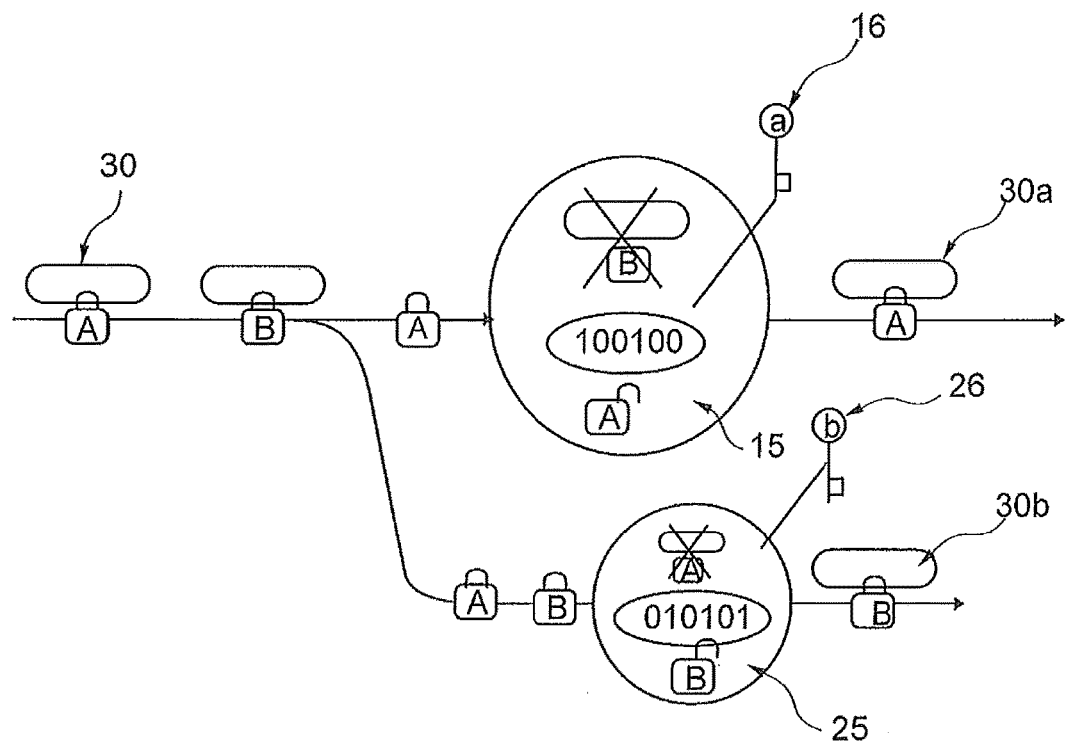
FIG. 2 schematically shows encrypting of multi-tenant data stream for secure transmission in the stream processing network according to the present invention, where the processing unit processes the messages if it can decrypt them, else drop.

FIG. 2 schematically shows an method for separating the data streams using encryption. The data 30 comprises data packets A and B, both in encrypted format. The process element 15 is capable to decrypt the encrypted data packets A, e.g. since it has the decryption key 16 that corresponds to the encryption key used for encrypting of the data packets A. The data packets B cannot be decrypted by the processing element 15 and will be dropped. At the output of the processing element 15, the data stream 30a is formed by the data packets A. The data stream 30b may be processed similarly by the processing element 25 with the decryption key 26.

The channels between processing elements are encrypted with one or multiple keys per entity. Either symmetric or asymmetric encryption may be used.

At least a part of the information in the data stream is encrypted with one or multiple keys per entity, either using symmetric encryption or asymmetric encryption. For instance, one message may contain unencrypted, e.g. addresses, time stamps, and encrypted information associated with multiple entities. In particular, one processing element shared between multiple entities may process the unencrypted parts of the message while maintaining confidentiality of the encrypted part. Such processing may be routing, sorting, merging, joining, load shedding, removing duplicates, etc. Alternatively, one processing element shared between multiple entities processes messages associated with different entities sequentially and at each point has access to cryptographic keys of only the one entity associated with the message and maintains no message-related state when switching from one message to another.

In order to avoid leakage of the confidential information, the processing element may operate on encrypted information without decrypting it by means of homomorphic encryption.

The homomorphic encryption is used to calculate aggregate information using messages associated with multiple entities without accessing or disclosing the actual information. Further, the homomorphic encryption can be also used to offer computational functions across multiple entities. For example, multiple data stream may need the same cleaning, (pre-)processing functionality, which can be performed by the same processing elements in a secure manner.

According to a further aspect of the present invention, the channels and processing elements associated with one entity, i.e. domain or processing network, can be distributed over multiple hosts. Further, the processing elements of a domain can be moved between hosts or replicated, e.g., for fault tolerance, performance gains, or load balancing.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF DESIGNATIONS

10, 15 processing instance 1 of type T, first data processing unit
20, 25 processing instance 2 of type T, first data processing unit
16,26 decryption key
30 input data
30a first data stream
30b second data stream
A label of data packets of the first data stream
B label of data packets of the second data stream

The invention claimed is:

1. Method of secure processing of input data by a stream processing network having a first and a second processing unit, wherein the method comprises:
   a) transmitting first and second data streams over a communication channel, the first and second data streams being mixed together as input data transmitted over the same communication channel;
   b) receiving the input data from the same communication channel, wherein the input data includes the first data stream associated with a first owner and the second data stream associated with a second owner;
   c) distinguishing data packets of the first data stream from that of the second data stream using meta tags in headers of data packets of the first and second data streams;
   d) securely processing the first data stream with the first processing unit; and
   e) securely processing the second data stream with the second processing unit;
   wherein contents of the first data stream are not revealed to the second processing unit and contents of the second data stream are not revealed to the first processing unit.

2. Method according to claim 1, wherein the first data stream includes a confidential part, and wherein prior to the step a) the method comprises:
   encrypting at least the confidential part of the first data stream.

3. Method according to claim 2, comprising:
   decrypting the first data stream by the first processing unit using a first decryption key corresponding to a first encryption key used for encrypting the first data stream.

4. Method according to claim 2, wherein the second data stream includes a confidential part, and wherein the method comprises:
   encrypting at least the confidential part of the second data stream.

5. Method according to claim 4, comprising:
   decrypting the second data stream by the second processing unit using a second decryption key corresponding to a second encryption key used for encrypting the second data stream.

6. Method according to claim 1, wherein the first data stream includes a confidential part, and wherein prior to the step a) the method comprises:
   encrypting at least the confidential part of the first data stream.

7. Method according to claim 1, comprising:
   decrypting the first data stream by the first processing unit using a first decryption key corresponding to a first encryption key used for encrypting the first data stream.

8. Method according to claim 7, comprising:
   decrypting the second data stream by the second processing unit using a second decryption key corresponding to a second encryption key used for encrypting the second data stream.

9. Method according to claim 1, wherein the first and second processing units are separate components.

10. Method according to claim 1, further comprising:
    encrypting a confidential part of the first data stream prior to step a) with a first encryption key;

encrypting a confidential part of the second data stream prior to step a) with a second encryption key;

decrypting the first data stream by the first processing unit using a first decryption key corresponding to the first encryption key; and decrypting the second data stream by the second processing unit using a second decryption key corresponding to the second encryption key;

wherein the first processing unit does not have access to the second decryption key and the second processing unit does not have access to the first decryption key.

11. Method of secure processing of input data by a stream processing network having a first and a second processing unit, wherein the method comprises:
   a) transmitting first and second data streams over a communication channel, the first and second data streams being mixed together as input data transmitted over the same communication channel;
   b) receiving the input data from the same communication channel, wherein the input data includes the first data stream associated with a first owner and the second data stream associated with a second owner;
   c) distinguishing data packets of the first data stream from that of the second data stream;
   d) securely processing the first data stream with the first processing unit; and
   e) securely processing the second data stream with the second processing unit;

wherein contents of the first data stream are not revealed to the second processing unit and contents of the second data stream are not revealed to the first processing unit;

wherein the first data stream includes a confidential part, and wherein prior to the step a) the method comprises encrypting at least the confidential part of the first data stream;

wherein the second data stream includes a confidential part, and wherein the method comprises encrypting at least the confidential part of the second data stream;

wherein the encrypting and processing are carried out by homomorphic encryption.

12. Method according to claim 11, wherein the confidential part of the first or second data stream is relevant for multiple owners, the method comprising:
using the homomorphic encryption to compute aggregate information on encrypted data items directly.

13. Method according to claim 11, comprising:
using the homomorphic encryption to provide computational functions across multiple entities, in order to avoid a revealing confidential part of the data streams.

14. Method of secure processing of input data by a stream processing network having a first and a second processing unit, wherein the method comprises:
   a) transmitting first and second data streams over a communication channel, the first and second data streams being mixed together as input data transmitted over the same communication channel;
   b) receiving the input data from the same communication channel, wherein the input data includes the first data stream associated with a first owner and the second data stream associated with a second owner;
   c) distinguishing data packets of the first data stream from that of the second data stream;
   d) securely processing the first data stream with the first processing unit; and
   e) securely processing the second data stream with the second processing unit;

wherein contents of the first data stream are not revealed to the second processing unit and contents of the second data stream are not revealed to the first processing unit;

further comprising decrypting the first data stream by the first processing unit using a first decryption key corresponding to a first encryption key used for encrypting the first data stream, and decrypting the second data stream by the second processing unit using a second decryption key corresponding to a second encryption key used for encrypting the second data stream;

wherein the encrypting and processing are carried out by homomorphic encryption.

15. Method of secure processing of input data by a stream processing network having a first and a second processing unit, wherein the method comprises:
   a) transmitting first and second data streams over a communication channel, the first and second data streams being mixed together as input data transmitted over the same communication channel;
   b) receiving the input data from the same communication channel, wherein the input data includes the first data stream associated with a first owner and the second data stream associated with a second owner;
   c) distinguishing data packets of the first data stream from that of the second data stream;
   d) securely processing the first data stream with the first processing unit; and
   e) securely processing the second data stream with the second processing unit;

wherein contents of the first data stream are not revealed to the second processing unit and contents of the second data stream are not revealed to the first processing unit;

further comprising prior to step a): labeling the first data stream with a unique first owner ID by adding or appending the unique first owner ID as meta tags into headers of data packets of the first data stream, and labeling the second data stream with a unique second owner ID by adding or appending the unique second owner ID as meta tags into headers of data packets of the second data stream;

wherein step c) distinguishes data packets of the first data stream from that of the second data stream using the meta tags and unique first and second owner IDs.

16. Method according to claim 15, further comprising:
encrypting a confidential part of the first data stream prior to step a) with a first encryption key;

encrypting a confidential part of the second data stream prior to step a) with a second encryption key;

decrypting the first data stream by the first processing unit using a first decryption key corresponding to the first encryption key; and decrypting the second data stream by the second processing unit using a second decryption key corresponding to the second encryption key;

wherein the first processing unit does not have access to the second decryption key and the second processing unit does not have access to the first decryption key.

17. Method according to claim 16, wherein the unique first owner ID and unique second owner ID are not encrypted.

18. Method according to claim 17, wherein the first and second processing units are separate components.

* * * * *

UNITED STATES PATENT AND TRADEMARK OFFICE
CERTIFICATE OF CORRECTION

PATENT NO. : 10,482,270 B2
APPLICATION NO. : 14/602796
DATED : November 19, 2019
INVENTOR(S) : Martin Naedele and Thomas Locher It is certified that error appears in the above-identified patent and that said Letters Patent is hereby corrected as shown below:

On the Title Page

Item (73) Assignee: ABS Schweiz AG, Baden (CH) should be replaced with ABB Schweiz AG, Baden (CH)

Signed and Sealed this
Tenth Day of March, 2020

Andrei Iancu
*Director of the United States Patent and Trademark Office*